Figure 1:
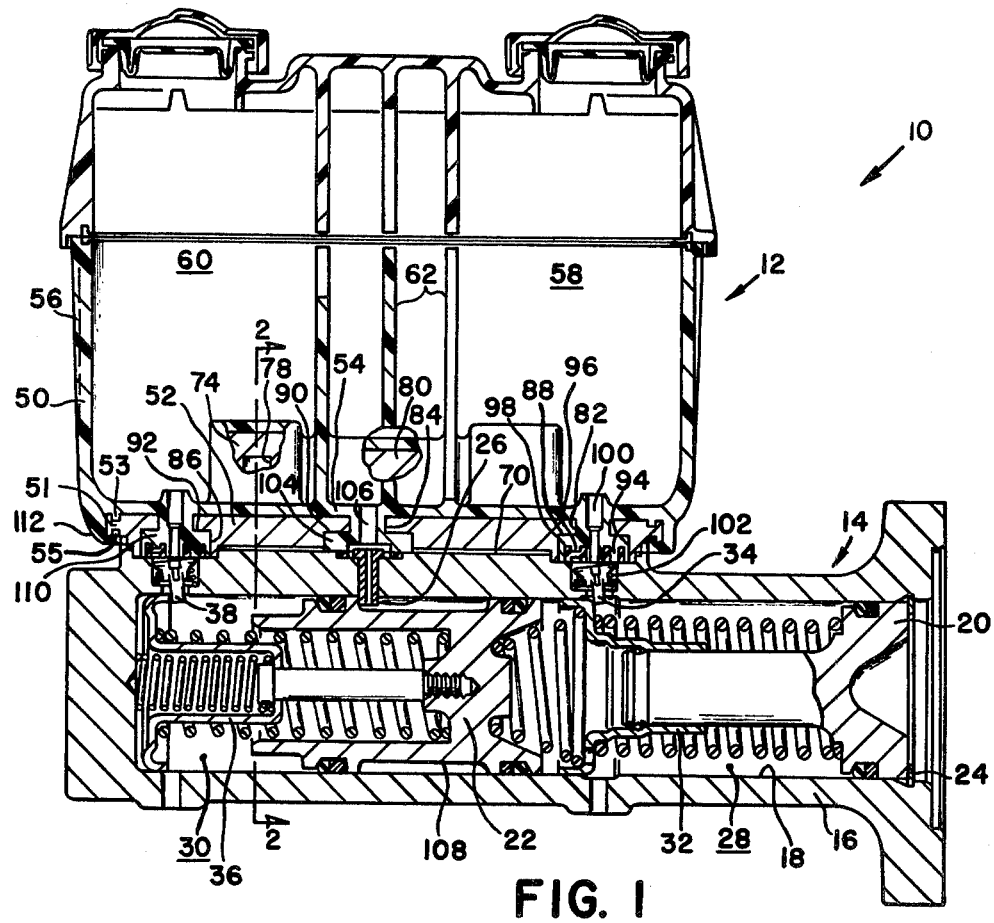

United States Patent [19]

Grabill

[11] Patent Number: 4,472,943
[45] Date of Patent: Sep. 25, 1984

[54] RESERVOIR ASSEMBLY FOR A MASTER CYLINDER

[75] Inventor: Paul J. Grabill, Mishawaka, Ind.

[73] Assignee: The Bendix Corporation, Southfield, Mich.

[21] Appl. No.: 432,592

[22] Filed: Oct. 4, 1982

[51] Int. Cl.³ .............................................. B60T 11/26
[52] U.S. Cl. ..................................... 60/585; 60/589; 60/592
[58] Field of Search ................ 60/585, 586, 587, 588, 60/589, 592; 150/55; 220/71, 94 R

[56] References Cited

U.S. PATENT DOCUMENTS

| | | | |
|---|---|---|---|
| 3,078,679 | 2/1963 | Mortimer et al. | 60/592 |
| 3,156,097 | 11/1964 | Brown | 60/588 |
| 3,940,013 | 2/1976 | Bonnett | 220/94 R |
| 4,133,178 | 1/1979 | Brooks, Sr. | 60/592 |

FOREIGN PATENT DOCUMENTS 2335530  1/1974  Fed. Rep. of Germany ........ 60/585

*Primary Examiner*—Robert E. Garrett
*Assistant Examiner*—Scott L. Moritz
*Attorney, Agent, or Firm*—Paul D. Schoenle; Ken C. Decker

[57] ABSTRACT

A reservoir assembly for a master cylinder includes a housing with a surface adapted to interface with the reservoir assembly. The reservoir assembly comprises a first part made from a lightweight plastic material and a second part made from a metallic material. The second part is adapted to fit on the surface while attachment of the reservoir assembly to the housing is provided for by the second part.

7 Claims, 2 Drawing Figures

RESERVOIR ASSEMBLY FOR A MASTER CYLINDER

This invention relates to a reservoir assembly for a master cylinder wherein at least one piston is movable within a housing to generate fluid pressure during braking.

A reservoir assembly for a master cylinder wherein the master cylinder defines a housing with a bore therein receiving a movable piston, the piston cooperating with valve means between the reservoir assembly and the bore to normally open fluid communication between the reservoir assembly and the bore in a rest position, the piston moving during braking to cooperate with the valve means in order to close communication between the reservoir assembly and the bore and develop fluid pressure in the bore biasing the valve means into tight sealing engagement with the reservoir assembly.

In U.S. Pat. No. 3,879,947 a reservoir assembly for a master cylinder is disclosed. The reservoir assembly includes a base with a side wall extending upwardly to retain fluid in the reservoir assembly. The reservoir assembly is made from a metallic material so that fluid pressure exposed to the base will not distort the metallic reservoir assembly. If the reservoir assembly were made from a light-weight plastic material, the fluid pressure exposed to the plastic reservoir assembly at the base would create sealing problems in view of the strength shortcomings of plastics when compared with metals and deformation of the plastic material would also require consideration.

The reservoir assembly for a master cylinder is characterized by said reservoir assembly comprising a first part forming a cavity to carry fluid therein and a second part adapted for attachment to said housing, said first part including a base forming an opening communicating said cavity to said bore via said valve means in the rest position, and said second part being connected to said base and defining an aperture for receiving a portion of said base which defines said opening and opposes said valve means.

It is an advantage of the present invention that the first part can be made from a light-weight plastic while the second part can be made from a metal to reduce distortion and sealing problems at the base of the plastic part.

Figure 2:
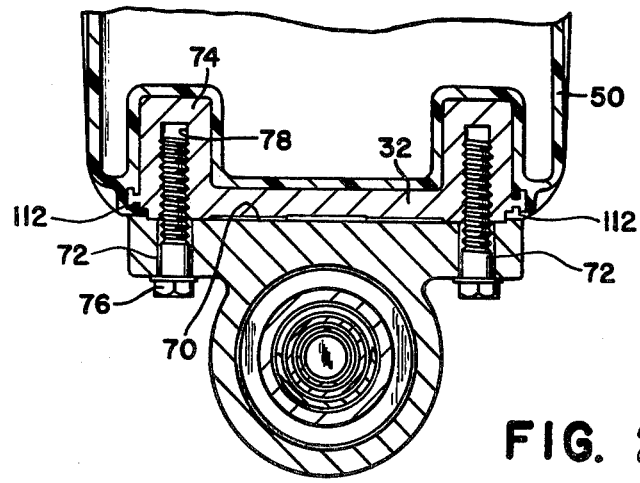

The invention will now be described with reference to the accompanying drawings, wherein:

FIG. 1 is a side cross-sectional view of a reservoir assembly and master cylinder constructed in accordance with the present invention; and FIG. 2 is a cross-sectional view taken along line 2—2 of FIG. 1.

The reservoir assembly and master cylinder are generally identified in combination as reference numeral 10 with the reservoir assembly 12 and the master cylinder 14. The master cylinder 14 includes a housing 16 with a bore 18 therein receiving a first piston 20 and a second piston 22. A snap ring 24 fixes the rest position for the first piston 20 and a stop 26 fixes the rest position for the second piston 22. The pistons cooperate with the wall of the housing bore 18 to define a first pressure chamber 28 and a second pressure chamber 30. A first sleeve 32 is coupled to the first piston 20 in order to control opening and closing of a first tilt valve 34. In a similar manner a second sleeve 36 is coupled to the second piston in order to control opening and closing of a second tilt valve 38. A plurality of springs are disposed within the bore 18 to control retraction of the pistons and sleeves upon termination of braking.

The reservoir assembly 12 includes a first part 50 and a second part 52. The first part is made from a lightweight plastic such as a glass-filled Nylon while the second part is made from a metal such as SAE 380 aluminum. The first part includes a base 54 with a side wall 56 extending therefrom to carry fluid within a pair of cavities 58 and 60 separated by a plurality of middle walls 62. The first part is formed by injection molding so that the second part 52 is impregnated in the mold for permanent attachment with the first part 50. To further enhance the attachment between the parts 50 and 52, the peripheral edge 51 of the second part 52 is provided with top and bottom recesses 53 and 55 which receive the lightweight plastic material during molding.

In order to attach the reservoir assembly 12 to the master cylinder housing 14, the housing 14 is provided with a flat planar surface 70 which is elevated slightly from the cylindrical outer surface of the housing 14. The housing includes openings 72, see FIG. 2, and the second part 52 is provided with integral bosses 74 at four locations corresponding to the number of openings 72. A threaded member 76 extends through the openings 72 to connect with the walls of a bore 78 formed in the bosses 74. The first part 50 covers the second part bosses 74 so that no portion of the second part is exposed to the fluid carried by the reservoir assembly. Consequently, no fluid passage or leak path is established between the parts 50 and 52.

Extending between the bosses of the second part 52 in an axial direction are second part webs 80 which are covered by the first part and intersecting the middle walls 62 to support the latter between the cavities 58 and 60.

The second part 50 defines three apertures 82, 84 and 86 which are stepped to form undercut recesses 88, 90 and 92. A portion of the base 54 extends into each aperture 82, 84 and 86. The first portion 94 of the base 54 substantially fills the undercut recess 88 and is provided with a groove to receive a first seal 96. The first seal 96 sealingly engages the wall of a relieved portion 98 of the flat planar surface 70 and is also sealingly engageable with the first tilt valve 34 when the latter is biased to a closed position. The base 54 and the first portion 94 cooperate to form an opening 100 extending from the reservoir cavity 58 to the bore 18 via the tilt valve 34 and a passage 102 in the housing 16 receiving the tilt valve 34. The second portion 104 of the base 54 substantially fills the undercut recess 90 and is also provided with an opening 106 to vent a recessed portion 108 of the second piston 22 to the reservoir 12. The stop 26 forms a portion of the communication via opening 106. The third portion 110 of base 54 substantially fills the undercut recess 92 and is identical to the first portion 94, so that the features of portion 94 are equally applicable for the portion 110.

In order to protect the planar surface 70, the bottom edge 112 of the base 54 adjacent recess 55 is engageable with the edge of the surface 70 when the threaded member 76 is fully engaged with the wall of bore 78 to connect the reservoir assembly 12 with the housing 14.

The reservoir assembly and master cylinder 10 operate in a conventional manner. That is, the pistons are movable within the bore to contract the volumes for the pressure chambers and close the tilt valves 34 and 36.

The contracted volumes generate fluid pressure which is communicated to appropriate brake circuitry to effectuate braking.

I claim:

1. A reservoir assembly for a master cylinder wherein the master cylinder defines a housing with a bore therein receiving a movable piston, the piston cooperating with valve means between the reservoir assembly and the bore to normally open fluid communication between the reservoir assembly and the bore in a rest position, the piston moving during braking to cooperate with the valve means in order to close communication between the reservoir assembly and the bore and develop fluid pressure in the bore biasing the valve means into tight sealing engagement with the reservoir assembly, characterized by said reservoir assembly comprising a first part forming a cavity to carry fluid therein and a second part adapted for attachment to said housing, said first part including a base forming an opening communicating said cavity to said bore via said valve means in the rest position, said second part being connected to said base and defining an aperture for receiving a portion of said base which defines said opening and opposes said valve means, said second part includes a boss extending away from said housing and said boss is adapted to receive a threaded member to secure said second part to said housing.

2. The reservoir assembly of claim 1 in which said first part is made from a plastic-like material and said second part is made from a metallic material.

3. A reservoir assembly for a master cylinder wherein the master cylinder defines a housing with a bore therein receiving a movable piston, the piston cooperating with valve means between the reservoir assembly and the bore to normally open fluid communication between the reservoir assembly and the bore in a rest position, the piston moving during braking to cooperate with the valve means in order to close communication between the reservoir assembly and the bore and develop fluid pressure in the bore biasing the valve means into tight sealing engagement with the reservoir assembly, said reservoir assembly comprising a first part forming a cavity to carry fluid therein and a second part adapted for attachment to said housing, said first part including a base forming an opening communicating said cavity to said bore via said valve means in the rest position, said second part being connected to said base and defining an aperture for receiving a portion of said base which defines said opening and opposes said valve means, said second part includes a web extending away from said housing, said first part includes a middle wall separating said cavity into separate chambers and said web intersects said middle wall to support the latter within said cavity.

4. The reservoir assembly of claim 1 in which said second part is provided with an undercut recess and said first part portion extends into said undercut recess to carry sealing means cooperating with said valve means and said housing.

5. A reservoir assembly for a master cylinder wherein the master cylinder defines a housing with a bore therein receiving a movable piston, the piston cooperating with valve means between the reservoir assembly and the bore to normally open fluid communication between the reservoir assembly and the bore in a rest position, the piston moving during braking to cooperate with the valve means in order to close communication between the reservoir assembly and the bore and develop fluid pressure in the bore biasing the valve means into tight sealing engagement with the reservoir assembly, said reservoir assembly comprising a first part forming a cavity to carry fluid therein and a second part adapted for attachment to said housing, said first part including a base forming an opening communicating said cavity to said bore via said valve means in the rest position, said second part being connected to said base and defining an aperture for receiving a portion of said base which defines said opening and opposes said valve means, said housing forming a recess adjacent a passage which receives said valve means, and said first part sealingly engages a wall for said recess when said second part is in abutment with the wall of said recess.

6. A reservoir assembly for a master cylinder wherein the master cylinder defines a housing with a bore therein receiving a movable piston, the piston cooperating with valve means between the reservoir assembly and the bore to normally open fluid communication between the reservoir assembly and the bore in a rest position, the piston moving during braking to cooperate with the valve means in order to close communication between the reservoir assembly and the bore and develop fluid pressure in the bore biasing the valve means into tight sealing engagement with the reservoir assembly, said reservoir assembly comprising a first part forming a cavity to carry fluid therein and a second part adapted for attachment to said housing, said first part including a base forming an opening communicating said cavity to said bore via said valve means in the rest position, said second part being connected to said base and defining an aperture for receiving a portion of said base which defines said opening and opposes said valve means, said second part being substantially rectangular with an outer edge substantially defining an outer boundary for said first part base and said outer edge is provided with a peripherally extending undercut groove in order to receive said first part whereby said undercut groove and said undercut recess receive said first part to connect said parts.

7. A reservoir assembly for a master cylinder wherein the master cylinder defines a housing with a bore therein receiving a movable piston, the piston cooperating with valve means between the reservoir assembly and the bore to normally open fluid communication between the reservoir assembly and the bore in a rest position, the piston moving during braking to cooperate with the valve means in order to close communication between the reservoir assembly and the bore and develop fluid pressure in the bore biasing the valve means into tight sealing engagement with the reservoir assembly, said reservoir assembly comprising a first part forming a cavity to carry fluid therein and a second part adapted for attachment to said housing, said first part including a base forming an opening communicating said cavity to said bore via said valve means in the rest position, said second part being connected to said base and defining an aperture for receiving a portion of said base which defines said opening and opposes said valve means, said housing forming a planar surface upon which said reservoir assembly is mounted and said first part is engageable with an edge of said planar surface to isolate the latter from contaminants in the atmosphere when said reservoir assembly is connected to said master cylinder housing.

* * * * *